Nov. 25, 1930.  S. J. KRANNAK  1,782,691
GREASE GUN COUPLING HEAD
Filed Aug. 3, 1929

Inventor
Steven J. Krannak
By his Attorney
Michael Kilgore

Patented Nov. 25, 1930

1,782,691

UNITED STATES PATENT OFFICE

STEVEN J. KRANNAK, OF MINNEAPOLIS, MINNESOTA

GREASE-GUN COUPLING HEAD

Application filed August 3, 1929. Serial No. 383,262.

My present invention relates to lubricator coupler systems, such as are used in lubricating various parts of automobiles and the like, and provides an extremely simple and highly efficient coupling head or device for connecting the grease-delivery pipe to the various receiving nipples on the automobile or other machine to be lubricated.

Generally stated, the invention consists of the novel devices, combinations of devices and arrangement of parts hereinafter described and defined in the claim.

Referring to the drawings, wherein like characters indicate like parts throughout the several views.

Figure 1:
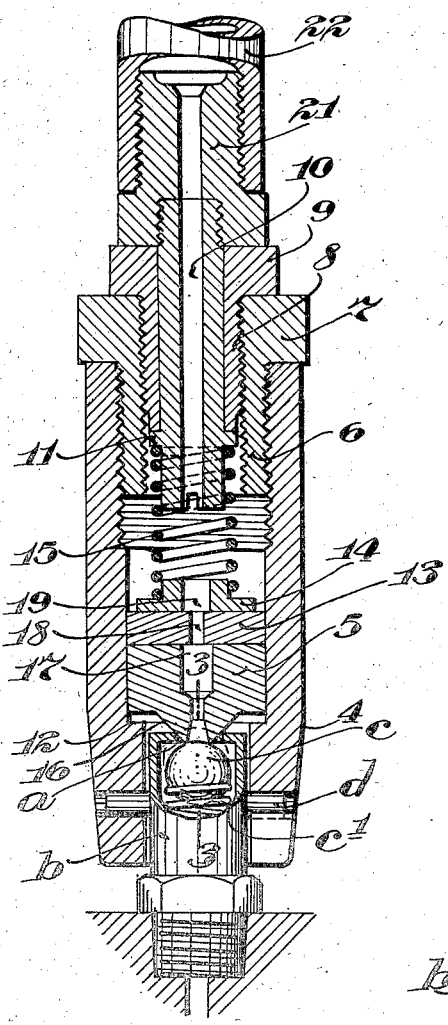
Fig. 1 is a view chiefly in axial section, but with some parts shown in full and some parts broken away, showing the improved coupling head applied to a grease-receiving nipple.
Figure 2:
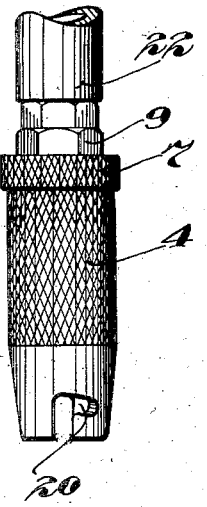
Fig. 2 is a plan view of the coupling head, some parts being broken away.
Figure 3:
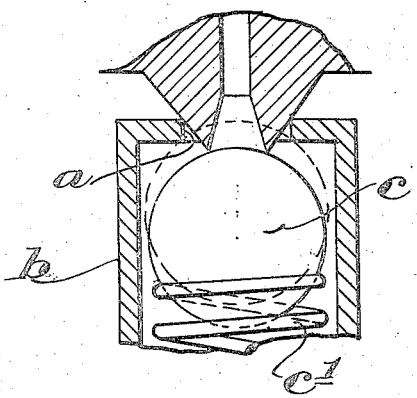
Fig. 3 is an enlarged fragmentary section taken on the line 3—3 of Fig. 1.

The coupling head or device proper comprises three main elements, to wit: a cylindrical casing 4, a plunger-acting nozzle 5, and a coupling sleeve 6. The sleeve 6 is internally and externally threaded and is screwed into the internally threaded end of the cylindrical casing 4 with its head 7 tightly jammed against the adjacent end of said casing. A secondary coupling sleeve 8 is screw-threaded into the sleeve 6 with its head 9 tightly jammed against the head 7. A grease delivery tube 10 is extended through and swiveled in the sleeve 8 and, short of its inner end, is provided with a collar or outstanding annular flange 11 that is tightly pressed against the inner end of said sleeve 8.

The plunger-acting nozzle 5 has a slight piston-like movement within the cylindrical casing 4, its outward movement being limited by an internal stop ledge 12 formed by a contraction of the outer portion of the bore of said casing. Working against the inner face of the nozzle 5 is a slightly pliable gasket 13, of material such as leather, that closely fits and forms a grease-tight joint against the cylindrical bore of the casing 4. The numeral 14 indicates a metallic washer placed against the gasket 13. The numeral 15 indicates a coiled spring that is telescoped over the inner end of the grease delivery tube 10 and over the hub of the washer 14 and reacts against said washer and against the collar 11 of the tube 10. This spring exerts a force that normally holds the collar 11 tightly pressed against the inner end of the sleeve 8 and the nozzle 5 pressed against the stop ledge 12. At its outer face, the nozzle 5 is formed with a conical seating surface 16 that is adapted to be forced into the grease-receiving port $a$ of a receiving nipple $b$ that is provided with a normally spring-seated inwardly opening check valve $c$ of the ball type. The plunger 5 is provided with an axial grease delivery passage 17 that extends axially through the conical seating surface 16 and is aligned with axial perforations 18 and 19 formed, respectively, in the gasket 13 and washer 14. The outer contracted portion of the bore of the casing 4 is adapted to be freely telescoped over the receiving nipple $b$ and said casing is formed at its outer portion with L-shaped bayonet notches 20 that are arranged to interlock with pins or projections $d$ on the receiving nipple $b$. The grease delivery tube 10 is shown as screwed into the tubular sleeve 21 at the delivery end of a grease pipe 22.

By reference to Fig. 1, it will be noted that the location of the bayonet notches or slots 20 to the stop ledge 12 is such that, when the head is coupled to the nipple, the conical seating surface 16 will be forced into the receiving port $a$ of the nipple $b$ to force the ball valve $c$ into an open position, and the nozzle 5 will be forced inward against the tension of the spring 15, so that it stands away from the stop ledge 12. Of course, the spring 15 will be much stronger than the spring $c'$ that presses the valve $c$ toward its closed position. Moreover, the spring 15 will be of sufficient tension to form a grease-tight joint between the seating surface 16 and port $a$ and to maintain such grease-tight joint against the high internal pressure under which the grease will be delivered to the nipple. With this construction, it is evident that the valve $c$ of the nipple $b$ will be unseated by the very act of applying the coupling head to the nipple and in advance of and independently of the delivery of grease. Of course, the pressure of the grease will force the ball valve further inward and out of engagement with the apex of the conical edge of the seating surface 16, so that the grease will be freely delivered into the nipple.

The device described, while of simple construction, strong and durable, has in practice been found highly efficient and satisfactory for the purposes had in view.

What I claim is:

A coupling head for grease delivery systems comprising a cylindrical casing having means for interlocking engagement with a receiving nipple equipped with outstanding lugs, a plunger-acting nozzle working in said casing and provided with a substantially conical axially perforated seating surface adapted to enter the receiving port of the grease-receiving nipple, a centrally perforated pliable gasket seated against the inner face of said nozzle and forming a tight joint with the bore of said casing, a sleeve structure applied in the receiving end of said casing, a grease delivery tube swiveled in said sleeve structure and having an annular shoulder forming a tight joint therewith, and a spring applied to the inner end of said grease delivery tube and reacting against and pressing said nozzle yieldingly outward.

In testimony whereof I affix my signature.

STEVEN J. KRANNAK.